United States Patent
Dai

(10) Patent No.: US 8,722,238 B2
(45) Date of Patent: May 13, 2014

(54) DIRECT RESISTANCE WELDING—SELF BRAZING OF ALUMINUM TO MOLYBDENUM PIN

(75) Inventor: Xiangyang Dai, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 649 days.

(21) Appl. No.: 12/944,859

(22) Filed: Nov. 12, 2010

(65) Prior Publication Data

US 2011/0123856 A1 May 26, 2011

Related U.S. Application Data

(60) Provisional application No. 61/263,659, filed on Nov. 23, 2009.

(51) Int. Cl.
*H01M 2/24* (2006.01)
*H01M 2/30* (2006.01)

(52) U.S. Cl.
USPC ............... 429/179; 429/161; 219/50; 219/55; 219/56; 219/56.22

(58) Field of Classification Search
USPC .................. 429/178, 179, 161; 29/623.1; 219/121.64
See application file for complete search history.

(56) References Cited

U.S. PATENT DOCUMENTS

| | | |
|---|---|---|
| 4,252,263 A | 2/1981 | Houston |
| 4,761,355 A | 8/1988 | Skarstad et al. |
| 4,865,932 A | 9/1989 | Masuda et al. |
| 5,250,373 A | 10/1993 | Muffoletto et al. |
| 5,354,629 A | 10/1994 | Kuroda et al. |
| 5,571,146 A | 11/1996 | Jones et al. |
| 5,750,286 A | 5/1998 | Paulot et al. |
| 5,786,559 A * | 7/1998 | Ottino et al. ............. 219/121.64 |
| 6,503,640 B2 | 1/2003 | Wittebrood et al. |
| 6,929,881 B2 | 8/2005 | Wutz et al. |
| 7,081,142 B1 | 7/2006 | Carlson |
| 7,108,942 B1 | 9/2006 | Gan et al. |
| 7,341,802 B1 | 3/2008 | Ota et al. |
| 7,539,007 B2 | 5/2009 | Zhao et al. |
| 7,622,219 B2 | 11/2009 | Ota et al. |
| 2001/0003863 A1 | 6/2001 | Thibault et al. |
| 2004/0038070 A1 | 2/2004 | Dockus et al. |
| 2007/0037054 A1 | 2/2007 | Kikuchi et al. |

FOREIGN PATENT DOCUMENTS

| | | |
|---|---|---|
| EP | 0532312 | 3/1993 |
| EP | 1282178 | 2/2003 |
| EP | 1791198 | 5/2007 |
| EP | 1876668 | 1/2008 |
| EP | 2083462 | 7/2009 |
| EP | 2317589 | 5/2011 |
| EP | 2325928 | 5/2011 |

OTHER PUBLICATIONS

European Search Report for 2325928 dated Jun. 16, 2011. pp. 1-4.

* cited by examiner

*Primary Examiner* — Basia Ridley
*Assistant Examiner* — Caitlin Wilmot
(74) *Attorney, Agent, or Firm* — Steven W. Winn

(57) ABSTRACT

A direct welding process for joining a current collector to a terminal pin in the construction of electrochemical cells is described. The resistance welding process utilizes increased current combined with an applied force to bond dissimilar metals with a melting temperature differential of preferably more than 500° C. Preferably, the method is used to bond the terminal pin to the cathode current collector. This method of attachment is suitable for either primary or secondary cells, particularly those powering implantable biomedical devices.

22 Claims, 10 Drawing Sheets

DIRECT RESISTANCE WELDING—SELF BRAZING OF ALUMINUM TO MOLYBDENUM PIN

CROSS-REFERENCE TO RELATED APPLICATIONS

This application claims priority from U.S. Provisional Patent Application Ser. No. 61/263,659, filed Nov. 23, 2009.

FIELD OF THE INVENTION

The present invention relates to the art of electrochemical cells, and more particularly, to an improved method of connecting a current collector to a terminal pin.

The present invention is of a resistance welding method by which the terminal pin is directly connected to the current collector.

PRIOR ART

The recent rapid development in small-sized electronic devices having various shape and size requirements requires comparably small-sized electrochemical cells of different designs that can be easily manufactured and used in these electronic devices. Preferably, the electrochemical cell has a high energy density, and one commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the terminal pin to the current collector. The terminal pin connects the electrochemical cell's internal current collector to a load such as an implantable medical device.

However, because of the diverse materials with their respective distinct material properties, it is sometimes difficult to join and bond these components together. Typical bonding techniques, such as standard laser and resistance welding practices, are not always ideal in joining terminal pin and current collector materials.

Specifically with respect to the electrochemical cell, joining the terminal pin, typically composed of molybdenum, to that of the current collector, typically composed of aluminum or titanium, has been historically problematic. Previously, intermediate materials and processes have been used to accomplish the joining and bonding of these components made of diverse materials. These intermediate materials and processes add undesirable cost and complexity to the construction of electrochemical cells. Furthermore, such intermediate materials and processes can create brittle bonds that may not be sufficiently robust.

A perspective view of a typical prismatic electrochemical cell 10 is shown in FIG. 1. The cell 10 includes a casing 12 having spaced-apart front and back walls 14 and 16 joined by curved end walls 18 and 20 and a curved bottom wall 22. The casing has an opening 24 provided in a lid 26 used for filling the casing 12 with an electrolyte after the cell components have been assembled therein and lid 26 has been welded to casing 12. In its fully assembled condition shown in FIG. 1, a closure means 28 is hermetically sealed in opening 24 to close the cell. A terminal pin 30 is electrically insulated from lid 26 and casing 12 by a glass-to metal seal 32, as is well known to those skilled in the art.

U.S. Pat. Nos. 5,250,373 and 6,929,881 to Muffoletto et al. and Wutz et al., respectively, describe typical prior art prismatic cells similar to that described above with respect to FIG. 1 and having a terminal pin connected to a cathode current collector 34. These patents are assigned to the assignee of the present invention and are incorporated herein by reference. As shown in FIGS. 2 and 3, the prior art cell has a casing 12 housing a multi-plate electrode assembly 35 comprising cathode electrode components 38, 40 in electrical association with anode electrode components 42, 44. Cathode electrode components 38, 40 are pressed together and bonded against cathode current collector 34 while anode components 42 and 44 are in operative contact with respective cathode electrode components 38, 40. The cathode current collector 34 is provided with a tab 46 extending outwardly therefrom. A distal end of tab 46 is welded to a planar end of a proximal portion of a coupler 48. The distal end of the coupler 48 comprises an inlet that receives the proximal end of the terminal pin 30 welded therein. Terminal pin 30 provides electrical connection to cathode electrode components 38, 40 while casing 12 and lid 26 are in electrical contact with anode electrode components 42, 44 and serve as the anode terminal for this case-negative electrochemical cell.

The coupler 48 bridges the two dissimilar materials of the terminal pin 30 together with the cathode current collector 34. A laser weld bonds the terminal pin 30 to the distal end of the coupler 48 and an ultrasonic weld bonds the proximal end of the coupler 48 to the current collector 34. Such a process is complex and requires additional time and components.

The use of laser welding is not ideal. Laser welding requires that a cavity be burned into the terminal pin 30. This cavity is then filled with the material of the coupler 48 which creates a metallurgical bond. Such a cavity decreases the cross sectional area of the terminal pin 30 thereby decreasing its strength and possibly creating a brittle bond. Furthermore, laser welding requires exacting precision in bonding the materials together, which adds manufacturing complexity. In addition, ultrasonic welding requires crimping the metal pieces together which adds additional processing steps and complexity to the manufacturing process.

The present invention eliminates the need for a coupler 48 and associated processing complexity of the associated laser and ultrasonic welding processes. Instead, the present welding method enables the terminal pin 30 to be directly joined to the current collector 34. The present invention eliminates intermediate materials as well as the previously described laser and ultrasonic welding processes. Such a direct weld procedure reduces cost, complexity and creates a more robust connection. The direct resistance welding process of the present invention is fast, simple, easy to control and effective.

SUMMARY OF THE INVENTION

The present invention relates to a method of connecting an electrode current collector, particularly the tab of the current collector, to a terminal pin. Such a configuration forms a direct connection of the terminal pin to the current collector at the tab to provide an electrical connection therebetween. The present invention further relates to a method of connecting the terminal pin to the current collector of different material compositions, geometries and configurations. The present invention is a method of using a resistance welding process to form a direct connection between the terminal pin and current collector.

In this direct resistance welding method, two materials of significantly dissimilar melting temperatures are joined together in a strong bond. In that respect, the present invention comprises a method by which materials having dissimilar melting temperatures are directly joined by the simultaneous application of electrical energy and a mechanical force over a short duration of time. The electrical energy generates heat capable of melting the lower melting temperature material at a targeted area. The applied force is the second element that enables joining of the two materials.

The applied electrical energy melts the lower melting temperature material. This material then flows and wets the surface of the second, higher melting temperature material. The applied force compresses the two materials together and ensures physical contact during the welding process. When the two materials subsequently solidify, a strong bond between them is created. Unlike other welding processes, an inter metallic bond is not created at the weld contact using the resistance welding process of the present invention.

In a preferred embodiment of the present invention, a molybdenum terminal pin is directly joined to an aluminum current collector. Generally, a current collector is in electrical contact with the active material that comprises the anode, the active material that comprises the cathode, or both.

The terminal pin may be joined to a single anode or cathode current collector or to multiple anode and cathode current collectors, depending on the specific design and application requirements of the electrochemical cell. The present invention can also be utilized in a variety of rechargeable or non-rechargeable electrochemical cell designs and chemistries in both case negative and case positive designs. In a case negative design, the anode is connected to the casing. Alternatively, in a case positive design, the cathode is connected to the casing.

The welding process of the present invention is not limited to the connection of a molybdenum terminal pin to that of an aluminum current collector. Such a welding process can also be used to directly bond a series of metals of dissimilar melting temperatures, preferably metals in which their respective melting temperatures vary significantly.

Thus, the present invention overcomes many inherent difficulties in constructing an electrochemical cell. The present invention increases the cell design capabilities by allowing the terminal pin to directly join a wide variety of metals of differing melting temperatures that were previously not capable of bonding with a resistance weld process. The present invention reduces manufacturing cost and reduces construction complexity. The present invention provides for an electrochemical cell with a smaller, more compact size than is capable with some other cell designs, for example, those described above with respect to FIGS. 2 and 3 that use a coupler to bridge between the terminal pin and current collector. The present invention also allows for the utilization of different cell chemistries requiring the use of different current collector materials that would not normally allow for a direct connection with the terminal pin.

DETAILED DESCRIPTION OF THE PREFERRED EMBODIMENTS

Figure 1:
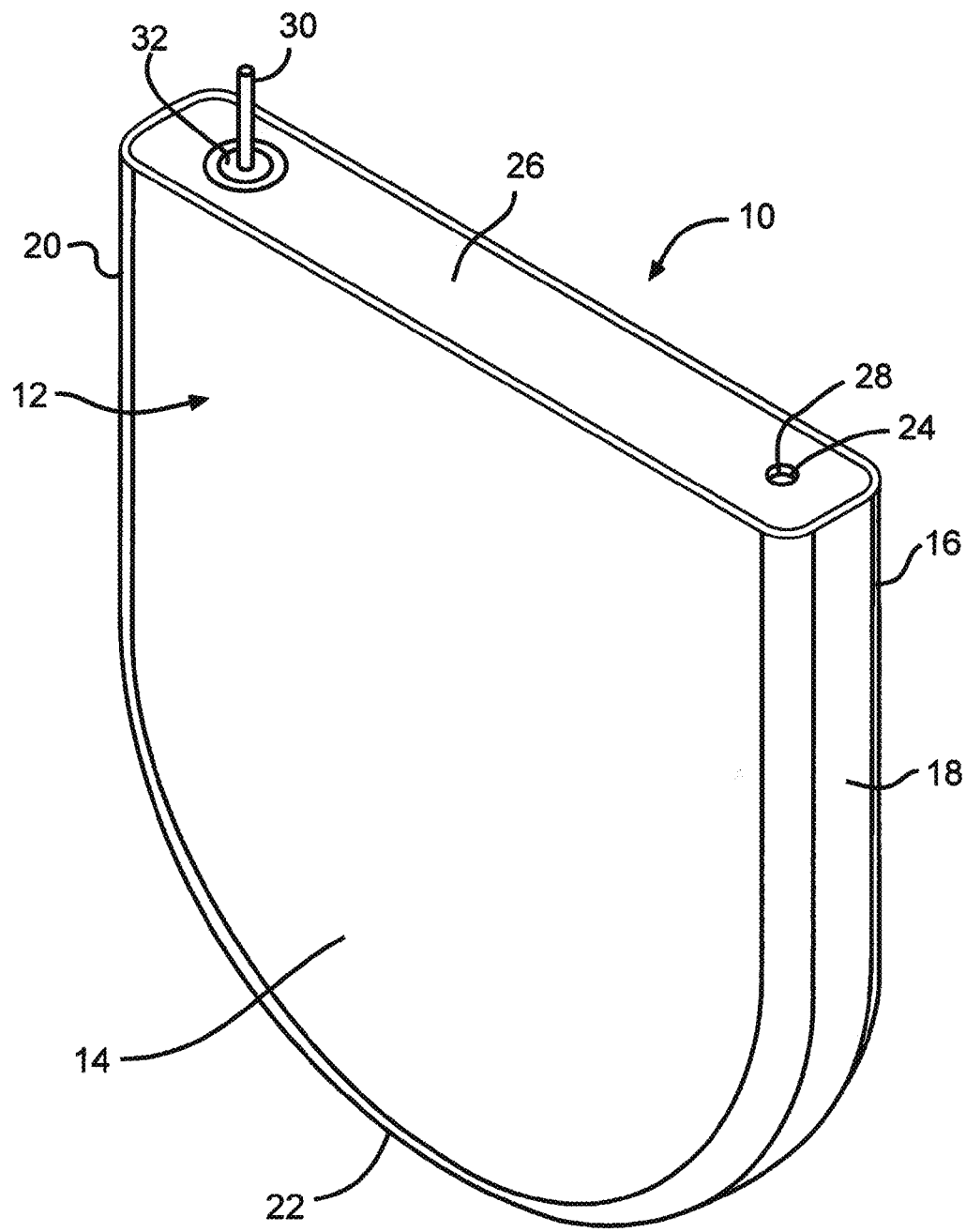
FIG. 1 is a perspective view of an electrochemical cell 10.

Referring now to FIGS. 4 to 11, there is shown an electrochemical cell 50 incorporating an electrode assembly 35 (FIGS. 4 and 7) connected to a terminal pin 52 and methods for providing the connection according to the present invention. In perspective, electrochemical cell 50 of the illustrated embodiment, is similar to the prismatic electrochemical cell 10 previously described in the Prior Art section with respect to U.S. Pat. No. 5,250,373 to Muffoletto et al. However, cell 50 has been modified to include a direct means of joining current collector 34 with terminal pin 52 of the present invention. In that respect, those parts or members which are the same in the prior art cell (FIGS. 2 and 3) and the electrochemical cell 50 of the present invention are provided with the same numerical designations.

Figure 4:
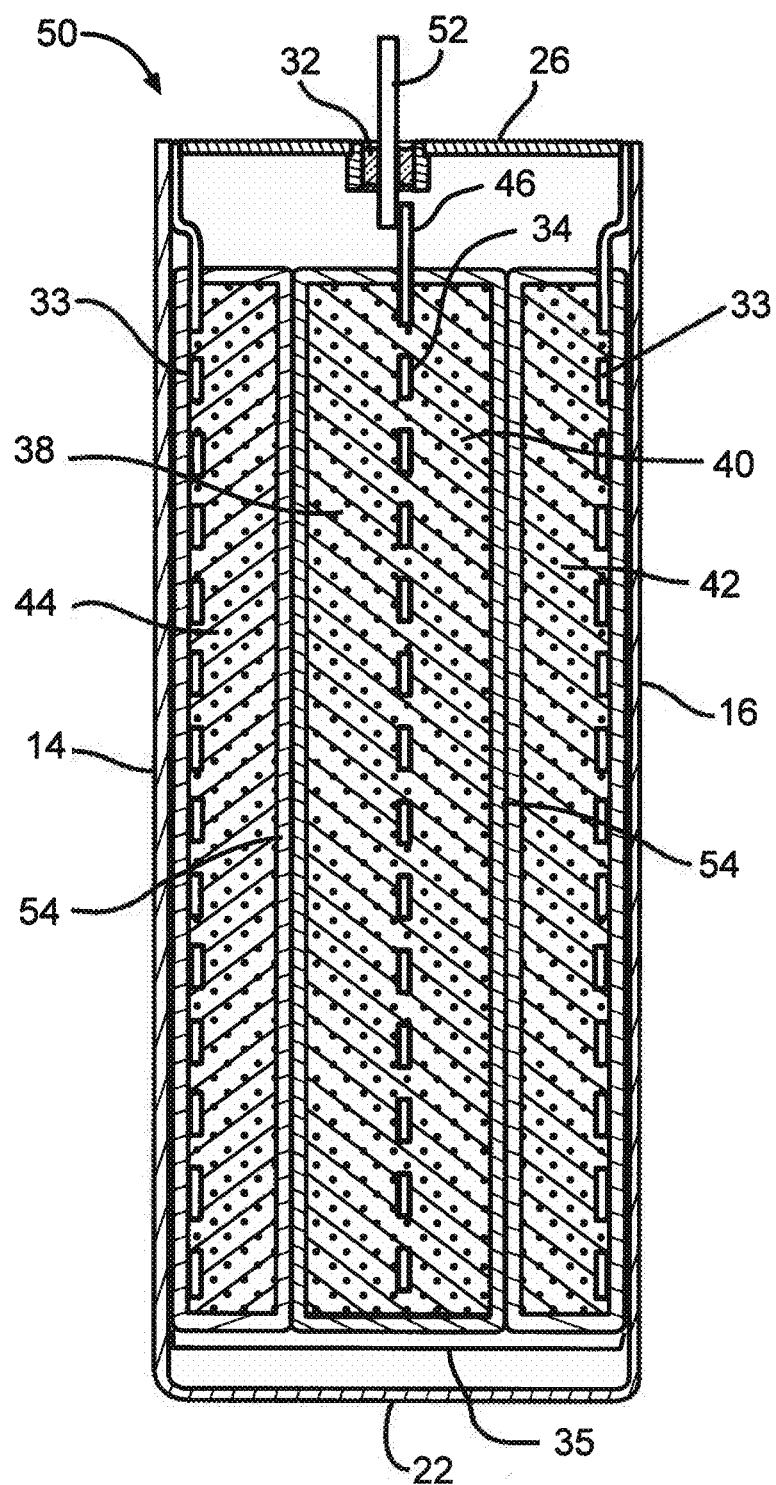
FIG. 4 is a cross-sectional view taken from the side illustrating the direct connection of the terminal pin 52 to the current collector 34 of the present invention.

As shown in the embodiment illustrated in FIG. 4, cell 50 comprises a casing 12 having spaced apart first and second side walls 14 and 16 extending to and meeting with opposed end walls (not shown) and a bottom wall 22. The end walls can be curved to provide the casing having an oval cross-section, or they can be generally planar to provide a rectangular cross-section.

Cell 50 comprises an electrode assembly 35 that further comprises anode electrode components 42, 44 and cathode electrode components 38, 40 prevented from contacting each other by a separator membrane 54. The anode electrode components 42, 44 are composed of an anode active material supported on an anode current collector 33. The cathode electrode components 38, 40 are composed of an active cathode material that is supported on a cathode current collector 34.

The embodiment shown in FIG. 4 is commonly referred to in the art as a case negative cell. Case negative electrochemical cells are constructed with anode electrode components 42, 44 that are electrically connected to casing 12 via the anode current collector 33 while the cathode electrode components 38, 40 are electrically connected to the terminal pin 52 via the cathode current collector 34. Alternatively, a case positive cell design may be constructed by reversing the connections. In other words, terminal pin 52 is connected to the anode electrode components 42, 44 via the anode current collector 33 and the cathode electrode components 38, 40 are connected to the casing 12 via the cathode current collector 34.

Both anode current collectors 33 and the cathode current collector 34 are composed of an electrically conductive material. It should be noted that the electrochemical cell 50 of the present invention as illustrated in FIGS. 4-7 can be of either a rechargeable (secondary) or non-rechargeable (primary) chemistry of a case negative or case positive design. The specific geometry and chemistry of the electrochemical cell 50 can be of a wide variety that meets the requirements of a particular primary and/or secondary cell application.

Figure 5:
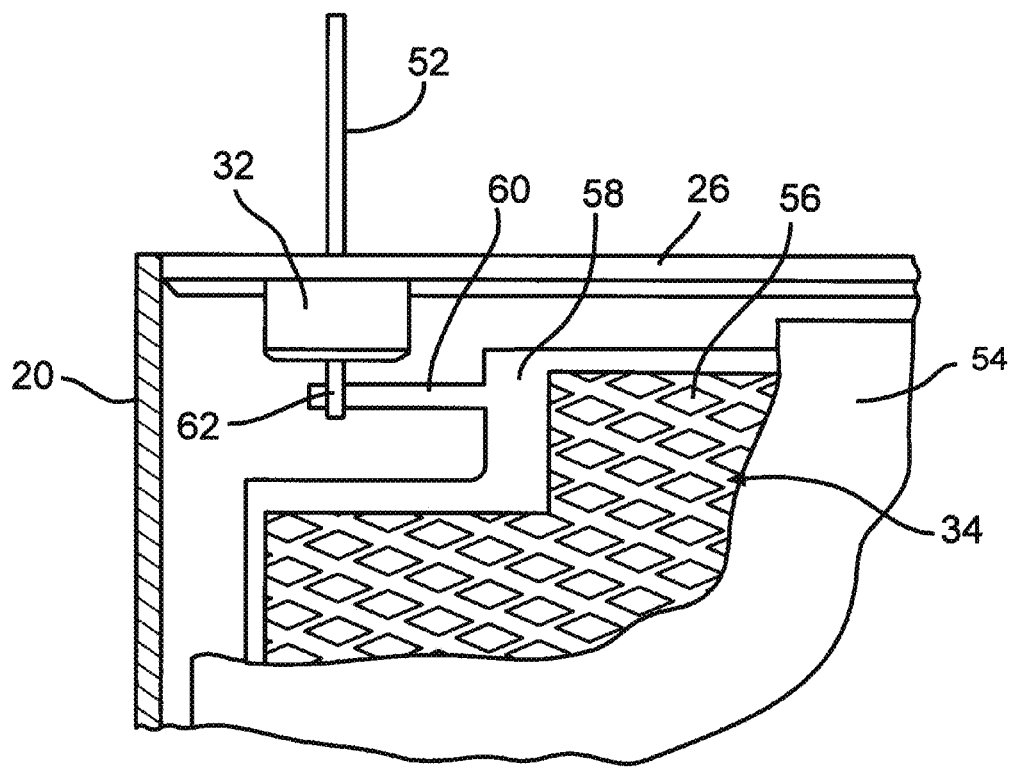
FIG. 5 is a cross-sectional view taken from the side depicting the direct connection of the terminal pin 52 to the current collector 34 of the present invention.

As shown in FIG. 5, the cathode current collector 34 of the present invention generally comprises a screen 56, an internal connection tab 58 in the form of a land that is co-planar with and surrounded by screen 56, and an integral external connection tab 60. Screen, as pertains to the present invention, is defined herein as a surface on which cathode or anode active material is deposited. A screen may be comprised of a foil having a solid surface or of a mesh or grid having a series of perforations throughout its surface.

Anode current collector 33 of the present invention, similarly to the cathode current collector 34, also generally comprises a screen 56, an internal connection tab 58 in the form of a land that is co-planar with and surrounded by screen 56, and an integral external connection tab 60.

In a first embodiment of the present invention, external connection tab 60, of either an anode current collector 33 or cathode current collector 34, is an outwardly extending continuation of internal tab 58. External tab 60 may not necessarily be coplanar with internal connection tab 58 and screen 56. External tab 60 may be of an extended, elongated strip of metal such as in a ribbon or coil form which may not be coplanar with either.

As shown in FIG. 5, weld area 62 is where the two dissimilar metals meet and are joined together. Weld area 62 is further defined as the area where terminal pin 52 is joined to a region of the current collector 33, 34 such as the external tab 60.

Thus, depending on the desired position of terminal pin 52 in cell 50, connection tabs 58 and 60 can be of various lengths or shapes to provide additional flexibility in joining the terminal pin 52 to the current collector 34. For example, if the design of the cell 50 requires terminal pin 52 to be positioned closer to or farther away from the center of lid 26, the current collector 34 of the present invention easily accommodates the design changes without having to be changed itself. Terminal pin 52 is simply joined to a different contact point on either the internal connection tab 58 or the external connection tab 60. Terminal pin 52 may also be joined directly to the current collector screen 56. Of course, there may be cell constructions where it is desirable to connect terminal pin 52 to multiple locations along the current collector 34. Such locations may include but are not limited to, the internal tab 58, the external tab 60 and the current collector screen 56. In addition, multiple current collector tabs 60 may be connected to terminal pin 52.

It will be apparent to those skilled in the art that terminal pin 52 can be directly joined to the current collector 34 at any contact point along the extent of the internal tab 58 and the external tab 60 by using the present resistance welding procedure. It will also be apparent to those skilled in the art that terminal pin 52 may be joined at any point along the anode or cathode current collector 33, 34.

Figure 2:
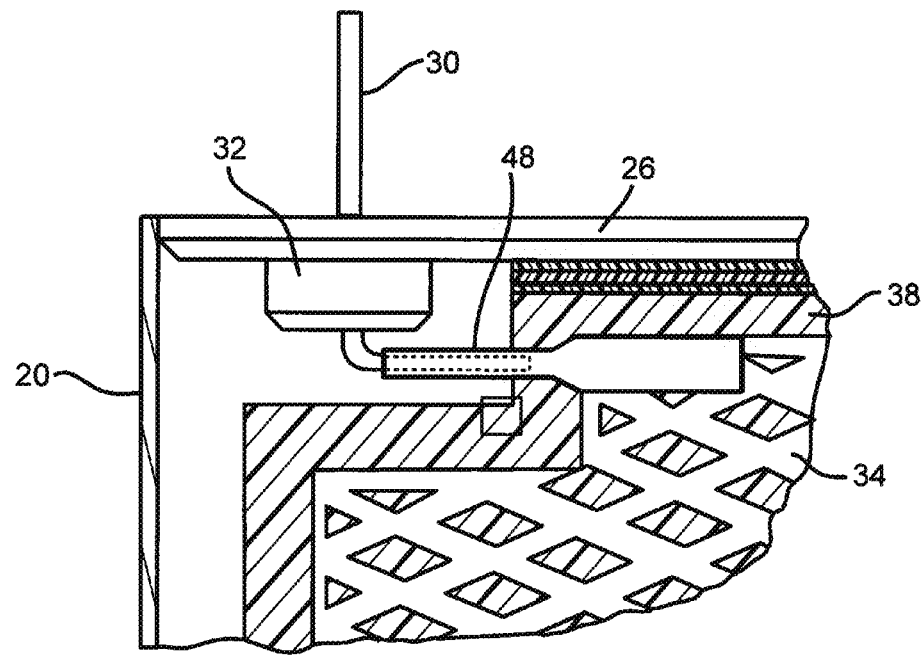
FIG. 2 is a cross-sectional view illustrating the prior art coupler 48 connecting the terminal pin 30 to the current collector 34.
Figure 3:
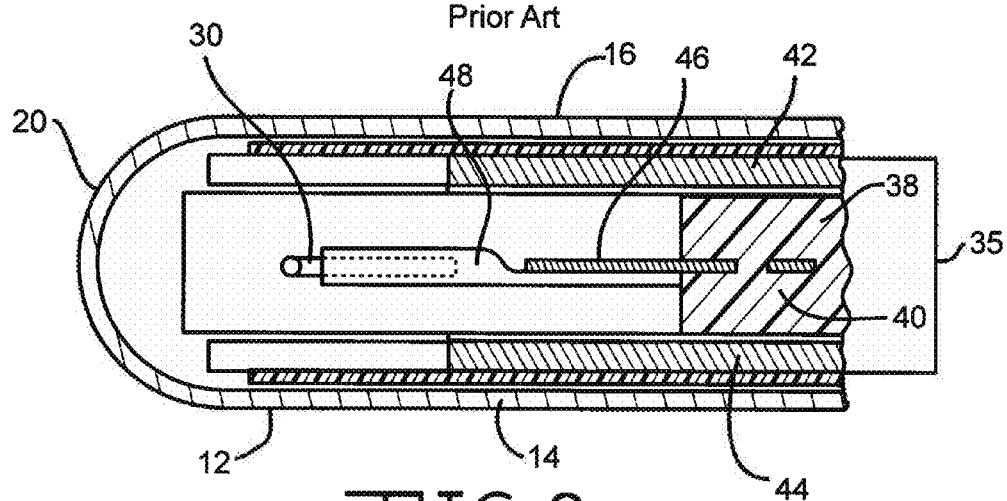
FIG. 3 is a cross-sectional view taken from the top showing the prior art coupler 48 connecting the terminal pin 30 to the current collector 34.
Figure 6:
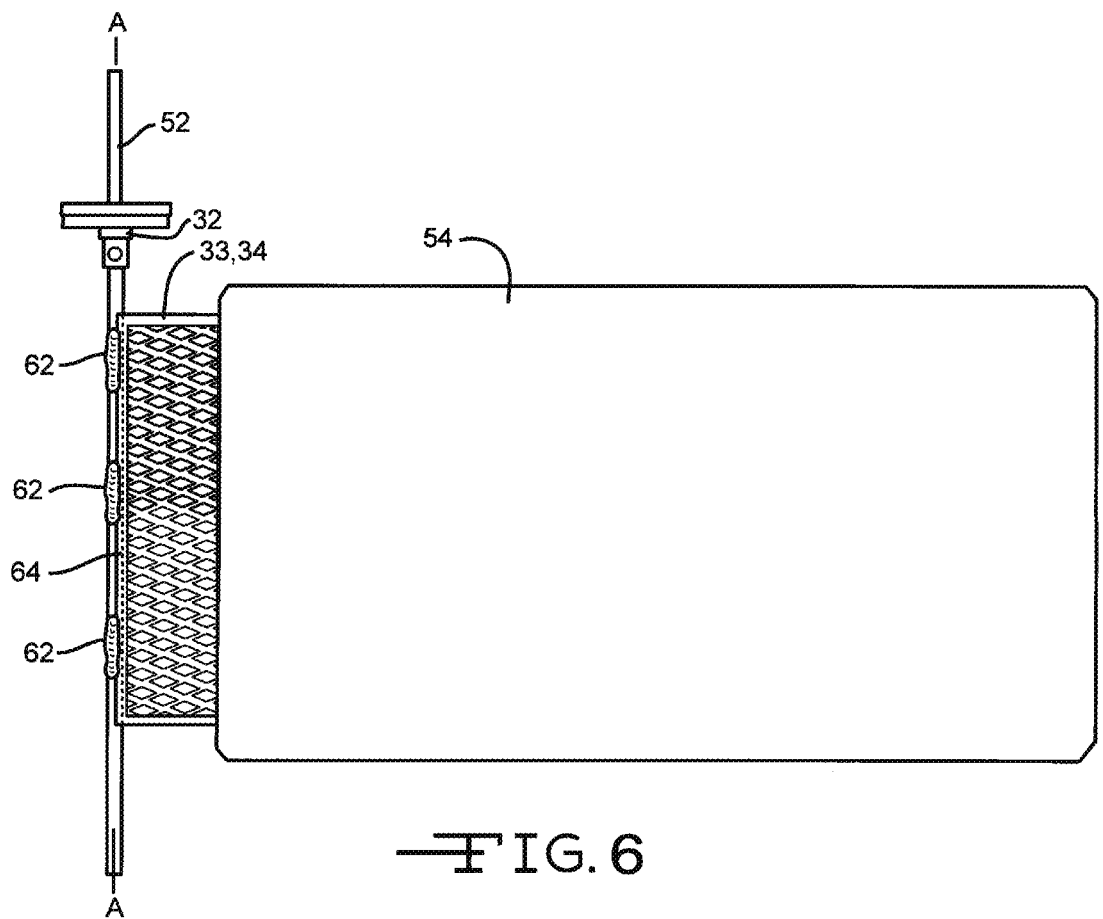
FIG. 6 is a perspective view of the direct connection of the terminal pin 52 to the side edge 64 of the current collector 33, 34 using the present direct resistance welding invention.

FIG. 5 illustrates a case negative embodiment in which cathode current collector 34 is directly joined to terminal pin 52. It is contemplated that anode current collector 33 could be substituted for cathode current collector 34 creating a case positive cell design. Such an embodiment is illustrated in FIG. 6 in which the terminal pin 52 is directly joined to either the anode or cathode current collector 33, 34. This construction eliminates the need for the prior art provision of a coupler element 48 as shown in FIGS. 2 and 3.

FIG. 6 illustrates an embodiment in which a portion of the side edge 64 of a current collector screen 56 is joined to the surface of the terminal pin 52 along vertical axis A-A using the present direct welding method. It is contemplated that terminal pin 52 is not necessarily limited to being joined at the end of side edge 64 as depicted in FIG. 6. Terminal pin 52 may be joined distal of side edge 64 along any portion of the screen 56 surface.

As illustrated in FIG. 6, the joining of terminal pin 52 to the side edge 64 may comprise multiple discrete weld areas 62 or a single weld area 62 that extends along the entire length of side edge 64 of either an anode or cathode current collector 33, 34. Such an anode or cathode current collector 33, 34 may be incorporated with an anode active material or cathode active material of the respective current collector 33, 34. It is contemplated that the embodiment shown in FIG. 6 would be useful in constructing electrochemical cells 50 of small compact sizes, such as in a "jelly roll" design, not shown. In a "jelly roll" design, a single or multiple current collectors 33, 34 are wound around a central vertical axis A-A of the terminal pin 52. The jelly roll design thus enables a small round compact electrochemical design.

Figure 7:
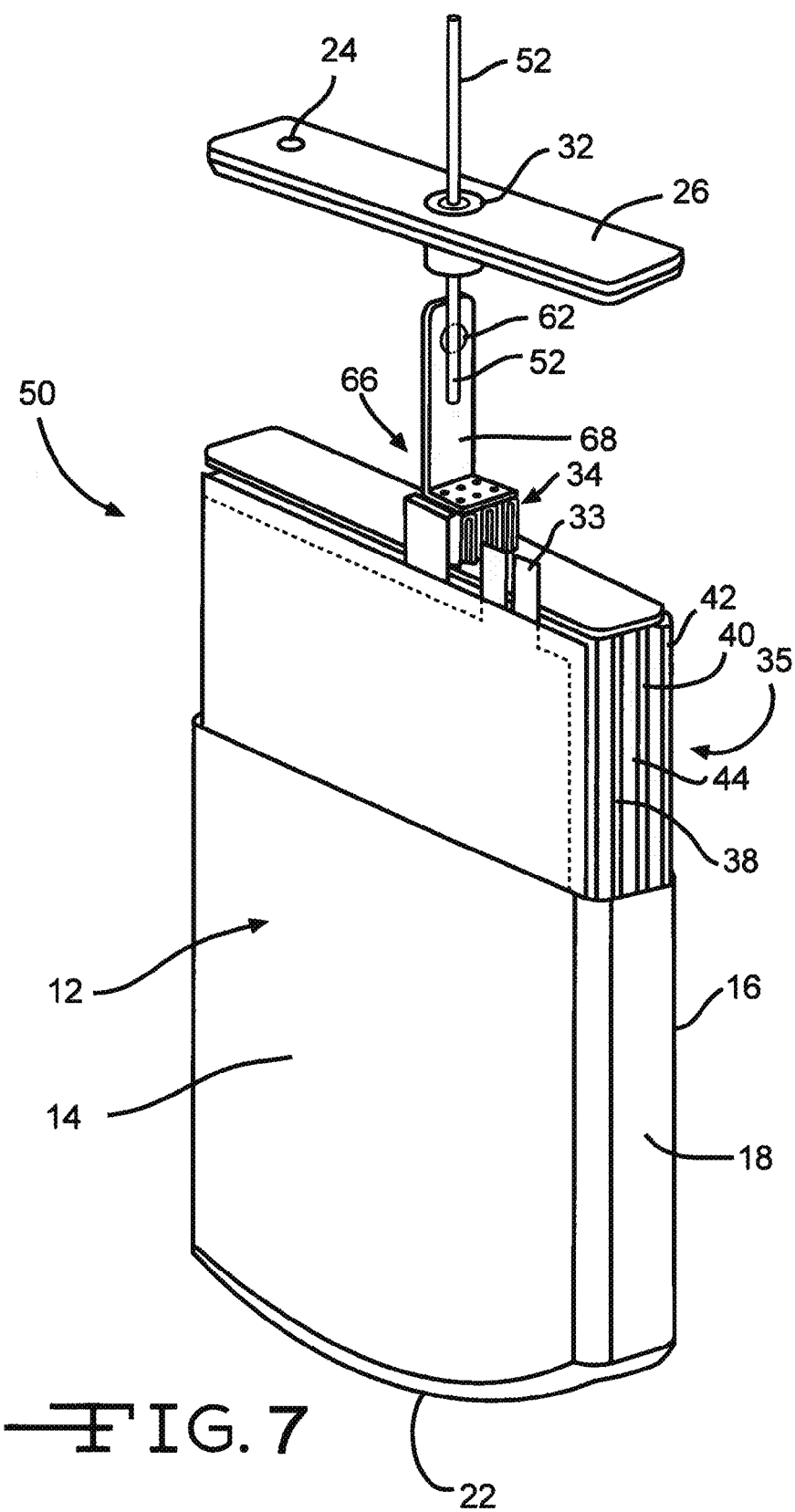
FIG. 7 is a perspective view of an electrochemical cell 50 illustrating the terminal pin 52 joined to a series of current collectors 34.

In an alternate embodiment, terminal pin 52 may be connected to multiple anode and cathode current collectors 33, 34 as illustrated in FIG. 7. FIG. 7 shows an embodiment illustrating electrode assembly 35 comprised of multiple cathode electrode components 38, 40 and anode electrode components 42, 44. As illustrated in FIG. 7, cathode electrode components 38, 40 and anode electrode components 42, 44 are proximate each other in an interleaved, alternating manner.

In the alternate embodiment shown in FIG. 7, the interleaved electrode assembly 35 is constructed by alternating cathode electrode components 38, 40 with that of anode electrode components 42, 44. Each of these cathode electrode components 38, 40 and anode electrode components 42, 44 are incorporated with their respective current collectors 33, 34 with an external tab 60 (FIG. 5) that extends outside each collector 33, 34.

As illustrated in the embodiment shown in FIG. 7, bridge 66 is formed from external connection tabs 60 of cathode current collectors 34. Bridge 66 of the illustrated embodiment is comprised of portions of electrically conductive external tabs 60 of cathode current collectors 34 that are folded over each other establishing electrical connection therebetween amongst the plurality of cathode current collectors 34. The associated anode current collectors 33 are electrically connected to casing 12. Therefore the illustrated embodiment, as shown in FIG. 7, is of a case negative cell design. An alternatively preferred embodiment is of a case positive design. In the contemplated case positive cell design, bridge 66 may be comprised of portions of anode current collectors 33.

As shown in FIG. 7, lead 68 is electrically connected to the series of current collector tabs 60 that comprise bridge 66. Lead 68 is preferably composed of a first metal, most preferably aluminum or titanium. As FIG. 7 illustrates, a portion of the terminal pin 52 is joined to lead 68 using the present direct resistance welding method, thereby creating an electrical connection between the electrode assembly 35 and terminal pin 52. It is contemplated that terminal pin 52 may be joined directly to bridge 66 using the resistance welding method of the present invention.

Figure 8:
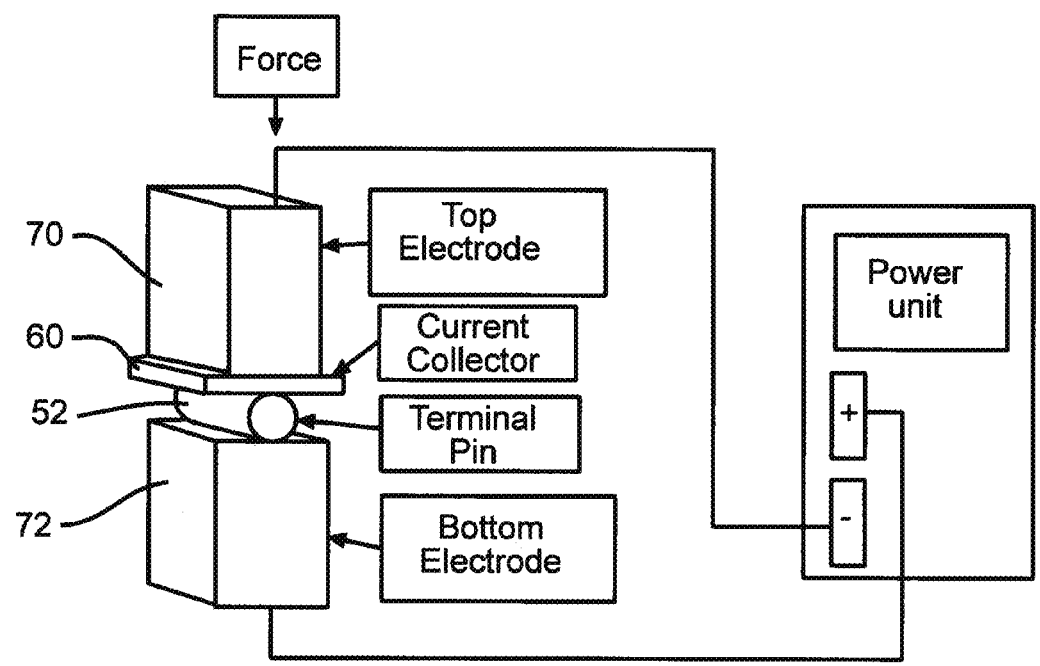
FIG. 8 is a diagram showing the direct resistance welding setup of the present invention.

In practice, as depicted in FIG. 8 two metals of dissimilar melting properties are placed between two opposing welding electrodes 70, 72 to create a bond therebetween. As defined herein, a first metal, for example an aluminum current collector 60, is a metal having a lower melting temperature than that of a second metal, for example a molybdenum terminal pin 52. The first and second metals 60, 52 are brought into contact with each other between the two opposing welding electrodes 70, 72. In the present invention, it is preferred that the first and second metals 60, 52 have a difference in melting temperature that is greater than 125° C., more preferably greater than 250° C. and most preferably greater than 500° C. Examples of first metals include, but are not limited to, aluminum (melting temperature 660° C.), titanium (melting temperature 1,725° C.), nickel (melting temperature 1,453° C.), steel (melting temperature 1,130° C.), stainless steel (melting temperature 1,353° C.), niobium (melting temperature 2,468° C.), copper (melting temperature 1,083° C.), gold (melting temperature 1,064° C.), silver (melting temperature 961° C.), palladium (melting temperature 1,554° C.), and combinations thereof. Examples of second metals include, but are not limited to, molybdenum (melting temperature 2,617° C.), tantalum (melting temperature 2,996° C.), tungsten (melting temperature 3,410° C.), and combinations thereof. It is contemplated that any or a combination of first metals 60 may be joined together with a second metal 52 as described in the present invention. It is preferred that the current collectors 33, 34 including the tab 60 of the cathode current collector 34 be composed of a first metal and that the terminal pin 52 be composed of a second metal.

As illustrated in FIG. 8, first and second metals 60, 52 are placed in contact between two welding electrodes 70, 72. For example, an aluminum current collector tab 60 and a molybdenum terminal pin 52 as illustrated in FIG. 5 are placed between the two opposing welding electrodes 70, 72. A current and force are applied to the metals between the top welding electrode 70 and bottom welding electrode 72. Simultaneously, a current preferably greater than 800 amperes and a force between about 10 to about 50 Newtons is applied to the materials 60, 52 for about one to ten milliseconds. The current is applied between the two welding electrodes 70, 72 while the force is applied to the top welding electrode 70 pressing the metals 60, 52 together. Alternatively, the force could also be applied at the bottom welding electrode 72 pushing upwards towards the two metals 60, 52 or applied equally between both welding electrodes 70, 72. The application of the current combined with the force forms a strong bond between the first and second metals 60, 52 within a few milliseconds. It is preferred that a current greater than 800 amperes be applied when using tungsten welding electrodes 70, 72 and a current greater than 1,000 amperes be applied when using copper welding electrodes 70, 72.

In a preferred embodiment, the welding electrode that is in contact with the first metal 60 is connected to the negative terminal of the electrical power unit or electrical power source. As depicted in FIG. 8, top welding electrode 70 is in contact with the first metal component (current collector 33, 34 including tab 60) and therefore is connected to the negative terminal 70 of the power unit or power source. Welding electrode 72, which is in contact with the second metal component (terminal pin 52), is connected to the positive terminal 72 of the electrical power unit or electrical power source. Experimental results have shown that if such a welding configuration is reversed, in which the negative terminal 70 of the power unit is connected to the welding electrode that is in contact with the second metal and the positive terminal 72 of the power unit is connected to the welding electrode that is in contact with the first metal, a robust bond between the two metals does not form as readily as if the reverse is the case.

Figure 8A:
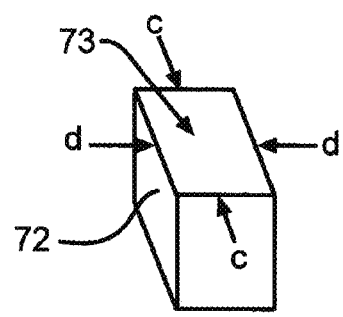
FIG. 8A is an enlarged illustration of the surface 73 of welding electrode 72.

The geometry of the welding electrode 72, in contact with the second metal component 52, as depicted in FIG. 8, is also important in creating a robust bond between the two dissimilar metals. It is preferred that the surface 73 of welding electrode 72 is planar. This preferred embodiment is illustrated in FIG. 8A. As depicted, it's preferred that the surface of the welding electrode 72, in contact with the second metal component (terminal pin 52) is rectangular in shape. However, the planar surface 73 of the welding electrode 70 in contact with the first metal component (current collector 33, 34 including tab 60) is not restricted to a specific geometry, but may be round, rectangular, triangular, etc.

Size of the surface 73 of the second metal component welding electrode 72 is also important in creating a robust bond between the two dissimilar metals 60, 52. As previously mentioned, experimental results show that it is preferred that the planar surface 73 that is in contact with the second metal 52 be rectangular. Further experimental results indicate that it is preferred that the length C-C and width D-D dimensions of surface 73 (FIG. 8A) of welding electrode 72 be at least twice that of the width or diameter of the second metal component 52. For example, surface length C-C and width D-D of welding electrode 72 should be at least twice that of the diameter of terminal pin 52.

It should be noted that either the first metal welding electrode 70 or the second metal welding electrode 72 can be positioned in either a top or bottom orientation. For a robust weld connection it is important that each welding electrode 70, 72 be connected to the preferred electrical terminal of the power source depending on the type of metal each electrode 70, 72 contacts. It's preferred that the positive terminal is connected to the second metal welding electrode 72 and the first metal welding electrode 70 is connected to the negative terminal to complete the electrical circuit. That is in addition to the preferred geometric and surface 73 criteria as previously mentioned.

Figure 9:
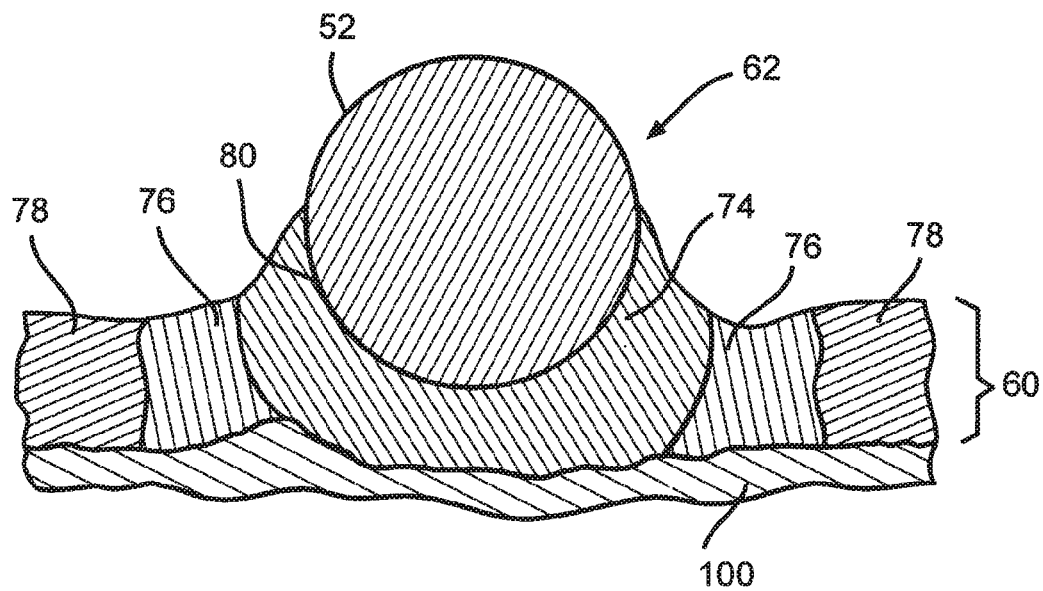
FIG. 9 is a cross-sectional illustration of the internal structure of weld area 62 of the present invention.

FIG. 9 is an illustration depicting a cross-sectional view of the internal structure of the resulting weld area 62 after the two metals 60, 52 are joined using the direct resistance weld process of the present invention. As shown, a bond between the two metals is created when the lower melting temperature first metal 60 melts and wets the surface of the higher melting temperature second metal 52. The term wetting as defined herein is the ability of a liquid to maintain contact with a solid surface. Specifically as related to the present invention, the liquid first metal 60 (lower melting temperature metal) wets the solid surface of the second metal 52 (higher melting temperature metal). The bond is created between the surfaces of the first and second metals 60, 52 when the weld area 62 solidifies.

Figure 10:
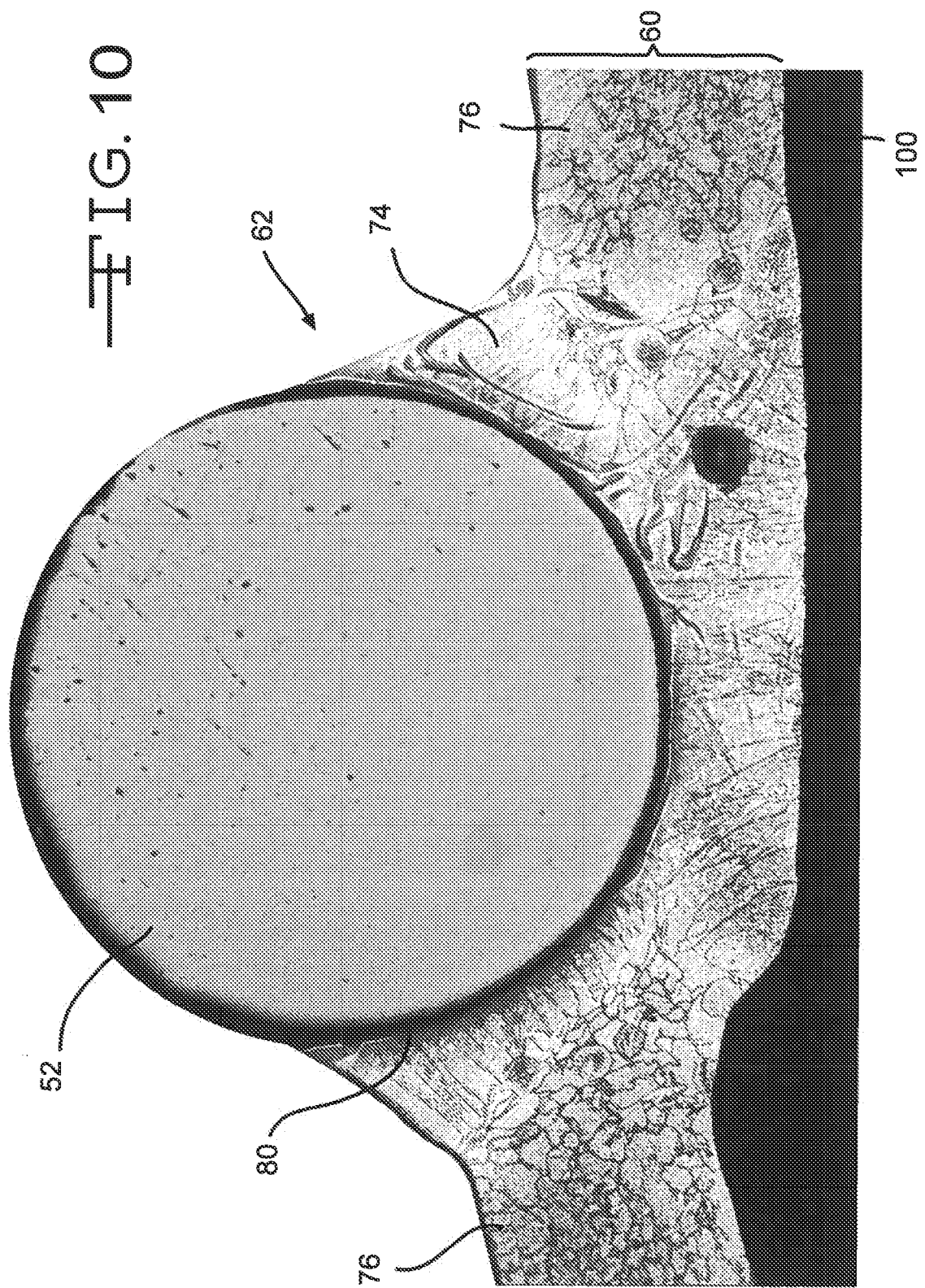
FIG. 10 is a micrograph image showing a cross-sectional view of the internal structure of weld area 62.
Figure 11:
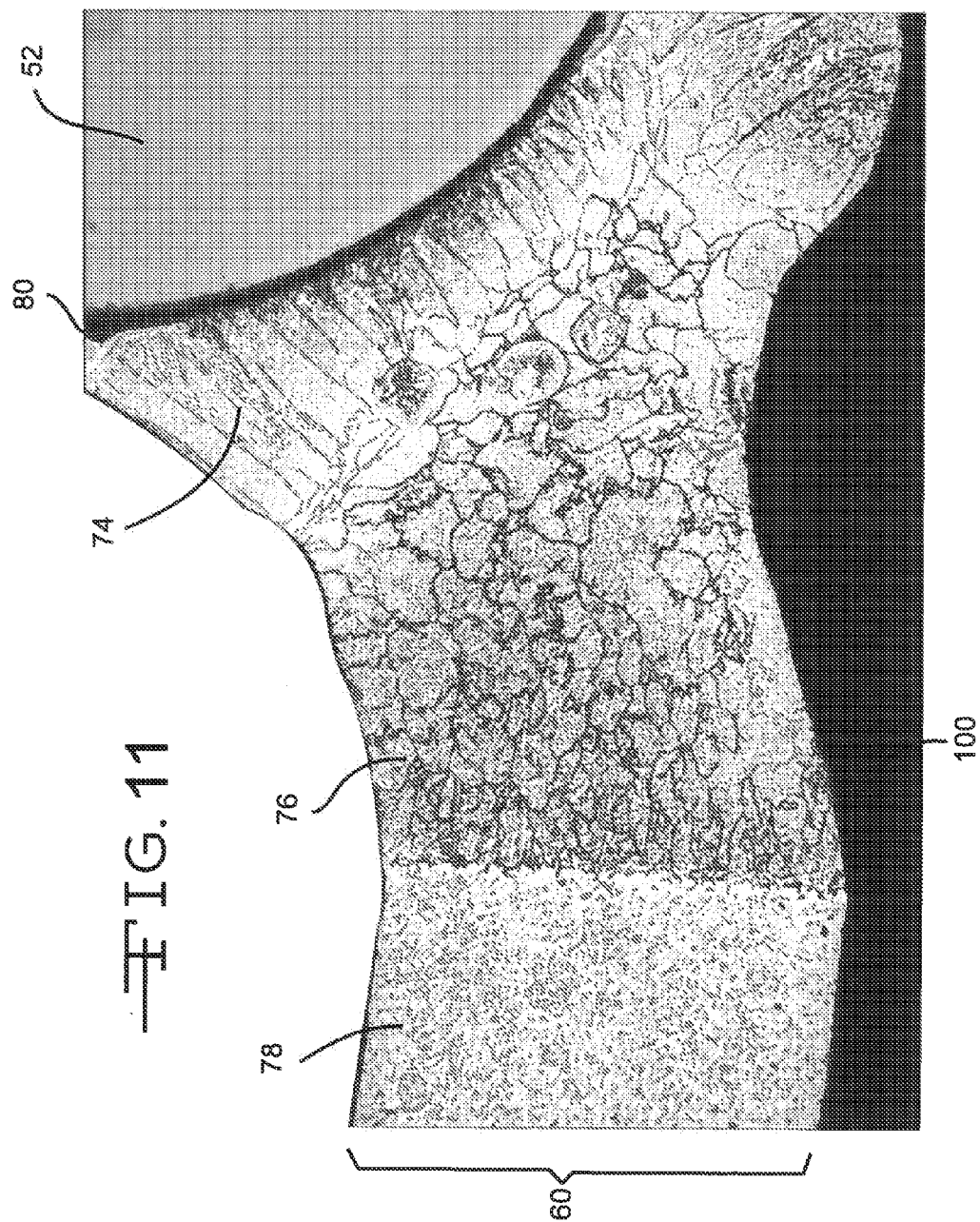
FIG. 11 is a micrograph image showing an enlarged cross-sectional view of the internal structure of weld area 62 shown in FIG. 10.

As depicted in FIG. 9, and shown in the micrographs in FIGS. 10 and 11, an interface 80 is created between the first and second metals 60, 52. Interface 80 is the region of contact between the two metals. It is along this interface 80 that the first and second metals 60, 52 are joined together. Unlike other joining methods, an inter metallic bond wherein the first and second metals 60, 52 are mixed and coexist is not created during the resistance welding process of the present invention.

As shown in FIG. 9, the weld area 62 of the first metal 60 is comprised of three zones. The first zone is the fusion zone 74. As the name implies, the fusion zone 74 comprises the area surrounding the interface 80 between the two dissimilar metals. The first metal 60 has melted and wetted the surface of the second metal 52. The fusion zone 74 is most proximate the wetted second metal 52 surface. The fusion zone 74 extends distally from interface 80 into the body of the first metal 60.

FIGS. 10 and 11 are optical micrographs that show the internal structure of welding area 62. The micrographs show that the first metal 60 (lower melting temperature) in the fusion zone 74 lacks grain structure of a typical first metal not affected by temperature. This lack of grain structure is characteristic of a first metal 60 in the fusion zone 74. Instead, the first metal in the fusion zone 74, particularly near the interface 80 between the first and second metals 60, 52, appears columnar in shape. A columnar grain structure results when a grain grows faster in one direction than in other directions. A columnar grain structure as defined herein is a grain structure that appears to have small lines that radiate from interface 80 into the body of the first metal 60.

This columnar grain appearance is indicative of the stresses that are created when extreme temperatures are applied to the surfaces of metals having extreme melting temperature differences over a short period of time, such as those conditions created during the resistance welding process of the current invention. Specifically, the columnar grain appearance is indicative of the rapid cooling and solidification along the elongated axis.

The grain structure of the first metal 60 in the fusion zone 74 may appear to comprise two distinct grain structures. The first grain structure is that of columnar growth as previously mentioned. The second grain structure is that of very small grain sizes on the order of 0.1 micrometers or smaller depending on the first metal chosen. Viewing these small grain sizes may require the use of high powered magnification devices. These smaller second grain structures may be equiaxed. An equiaxed grain structure is one in which the length and width have similar dimensions.

The heat generated by the welding process is sufficient to melt the first metal 60 in the fusion zone 74. After reaching its melting temperature, the first metal 60 begins to flow and wet the surface of the second metal. The second metal in the fusion zone 74 is not melted and acts as a barrier preventing flow of the melted first metal.

Heat from the welding process is quickly removed from the area when current is turned off and the metallic bond solidifies. This short duration of time does not allow for the grain structure of the first metal 60 to reorient itself into its normal grain structure as illustrated in the unaffected base metal zone 78 (FIG. 11). As a result, the first metal 60 quickly changes from a molten state to a solid state within a few milliseconds, thereby freezing the molten structure of the first metal 60 in the columnar grain structure shown.

The second zone, the heat affected zone (HAZ) 76, extends distally from the fusion zone 74. As shown in FIG. 9, two discrete HAZ 76 areas extend distally from each fusion zone 74. One HAZ 76 extends to the left and the other HAZ 76 extends to the right of the central fusion zone 74.

As shown in the micrographs in FIGS. 10 and 11, the HAZ 76 is indicative of a metal with grain sizes that are larger than those of the non-heat treated metal shown in base metal zone 78. The heat generated in the HAZ 76 is not sufficient to melt the first metal 60 in this zone, but the elevated temperature exposed in the HAZ 76 initiates re-crystallization and grain growth that results in a first metal with larger than normal grains. This is evident by the larger grain sizes shown in FIGS. 10 and 11 in the general area of the HAZ 76 in comparison to the base metal zone 78. It is typical that grains in the HAZ 76 increase to a size on the order of about 2 to about 10 times that of normal grains. For the aluminum metal example shown in FIG. 10, grain sizes range from about 3 to about 5 micrometers in the HAZ 76. These larger grain sizes can also be observed in the micrograph shown in FIG. 11 which is a magnified view of the left side HAZ 76.

The third zone, the base metal zone 78, is an area that extends distally from the HAZ 76 and is most distal the fusion zone 74. The base metal zone 78 is the area that is most distal from the heat of the resistance welding process and is, therefore, unaffected by the heat of the welding process of the present invention. As shown in the micrograph of FIG. 11, this zone has metal that is of a normal grain structure typical of its initial state before welding. For the aluminum metal example shown in FIG. 11, grain size is on the order of about 0.5 to about 2 micrometers.

Note, the black area 100 at the bottom of FIGS. 10 and 11 is an image artifact from the sample mounting material. This black area 100 is unrelated to the present invention and does not affect the resultant weld of the resistance weld process of the present invention.

As previously mentioned, the present invention is applicable to either primary or secondary electrochemical cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector 34.

The cathode of a primary cell is of electrically conductive material, preferably a solid material. The solid cathode may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell 50, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component 38, 40 may be prepared by rolling, spreading or pressing the cathode active mixture onto a suitable cathode current collector 34. Cathodes prepared as described are preferably in the form of a strip wound with a corresponding strip of anode material in a structure similar to a "jellyroll" or a flat-folded electrode stack, such as that illustrated in FIG. 6.

In order to prevent internal short circuit conditions, the cathode electrode 38, 40 is separated from the anode electrode 42, 44 by the separator membrane 54. The separator membrane 54 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3 SCF_3$, $LiC_6 F_5SO_3$, $LiO_2 CCF_3$, $LiSO_6F$, $LiB (C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode electrode 42, 44 comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode electrode 38, 40 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCO_{0.92}Sn_{0.08}O_2$ and $LiCO_{1-x} Ni_xO_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof. The current collector 33, 34 is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, that is for the purpose of illustration, not limitation.

What is claimed is:
1. An electrochemical cell, comprising:
a) a casing;
b) an electrode assembly contained within the casing, the electrode assembly comprising:
  i) an anode composed of an active anode material, a cathode composed of an active cathode material, and a separator membrane residing between the anode and the cathode; and
  ii) at least one current collector composed of a first metal of a first melting temperature, the current collector comprising a connection tab extending from a current collector body, wherein the current collector body is contacted to one of the active anode or cathode active materials to thereby form the respective anode or cathode; and
c) an electrolyte contained within the casing to activate the electrode assembly;
d) a terminal pin passing through a feedthrough in a non-conductive relationship with the casing, wherein the terminal pin is of a second metal having a second melting temperature greater than the first melting temperature of the first metal, and wherein the terminal pin extends from a proximal terminal pin portion connected inside the casing to the current collector for the one of the anode and the cathode to a distal terminal pin portion residing outside the casing as a first terminal for the anode or the cathode;

e) wherein the proximal terminal pin portion is joined to the connection tab of the current collector by a direct resistance weld, the weld comprising:
   i) a fusion zone of the first metal having a fusion zone thickness extending from an interface contacting the terminal pin to a distal fusion zone region, wherein the fusion zone is comprised of columnar shaped grains of the first metal radiating from the interface toward the current collector body; and
   ii) a heat affected zone of the first metal having a heat affected zone thickness extending from the distal fusion zone region to a distal heat affected region at the current collector body, wherein the heat affected zone is comprised of heat affected grains of the first metal, the heat affected grains being at least two times the size of grains of the first metal that are substantially unaffected by heat created during formation of the weld; and f) wherein the casing is a second terminal for the other of the anode and the cathode not connected to the terminal pin.

2. The electrochemical cell of claim 1 wherein the second melting temperature of the second metal comprising the terminal pin is at least about 125° C. greater than the first melting temperature of the first metal of the current collector.

3. The electrochemical cell of claim 1 wherein the second melting temperature of the second metal comprising the terminal pin is at least about 500° C. greater than the first melting temperature of the first metal of the current collector.

4. The electrochemical cell of claim 1 wherein the first metal of the current collector wets a surface of the second metal of the terminal pin at the interface of the fusion zone.

5. The electrochemical cell, of claim 1 wherein the first metal of the current collector is selected from the group consisting of aluminum, titanium, nickel, steel, stainless steel, niobium, copper, gold, silver, platinum, palladium, and combinations thereof.

6. The electrochemical cell of claim 1 wherein the second metal of the terminal pin is selected from the group consisting of molybdenum, tantalum, tungsten, and combinations thereof.

7. The electrochemical cell of claim 1 wherein the anode is composed of a first active electrode material selected from the group consisting of lithium, lithium alloys, lithium silver, lithium aluminum, lithium boron, lithium silver boron, carbon, and combinations thereof.

8. The electrochemical cell of claim 1 wherein the cathode is composed of a second active electrode material selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide and mixtures thereof.

9. The electrochemical cell of claim 1 wherein the electrolyte comprises a nonaqueous solvent and an ionically conductive salt dissolved therein.

10. The electrochemical cell of claim 1 wherein the direct resistance weld is characterized as having been formed by contacting the first metal of the current collector to a negative terminal of an electrical power source and the second metal of the terminal pin to a positive terminal of the electrical power source.

11. The electrochemical cell of claim 1 wherein the first metal within the fusion zone comprises second metallic grains up to 0.1 micrometers in size.

12. An electrochemical cell, comprising:
a) a casing;
b) an electrode assembly contained within the casing, the electrode assembly comprising:
   i) an anode composed of an active anode material, a cathode composed of an active cathode material, a separator membrane residing between the anode and the cathode; and
   ii) at least one current collector composed of a first metal of a first melting temperature, the current collector comprising a connection tab extending from a current collector body, wherein the current collector body is contacted to one of the active anode or cathode active materials to thereby form the respective anode or cathode; and
c) an electrolyte contained within the casing to activate the electrode assembly;
d) a terminal pin passing through a feedthrough in a non-conductive relationship with the casing, wherein the terminal pin is of a second metal having a second melting temperature greater than the first melting temperature of the first metal and wherein the terminal pin extends from a proximal terminal pin portion connected inside the casing to the current collector for the one of the anode and the cathode to a distal terminal pin portion residing outside the casing as a first terminal for the anode or the cathode;
e) wherein the proximal terminal pin portion is joined to the connection tab of the current collector by a direct resistance weld, the weld comprising:
   i) a fusion zone of the first metal having a fusion zone thickness extending from an interface contacting the terminal pin to a distal fusion zone region, wherein the first metal of the current collector is joined to the second metal of the terminal pin at the interface, an intermetallic alloy composed of the first metal and the second metal is not formed at the interface, and wherein the fusion zone is comprised of first columnar shaped grains of the first metal radiating from the interface toward the current collector body and second metallic grains up to 0.1 micrometers in size; and
   ii) a heat affected zone of the first metal having a heat affected zone thickness extending from the distal fusion zone region to a distal heat affected region at the current collector body, wherein the heat affected zone is comprised of heat affected grains of the first metal, the heat affected grains being at least two times the size of grains of the first metal that are substantially unaffected by heat created during formation of the weld; and
f) wherein the casing is a second terminal for the other of the anode and the cathode not connected to the terminal pin.

13. The electrochemical cell of claim 12 wherein the first metal of the current collector is selected from the group consisting of aluminum, titanium, nickel, steel, stainless steel, niobium, copper, gold, silver, platinum, palladium, and combinations thereof.

14. The electrochemical cell of claim 12 wherein the second metal of the terminal pin is selected from the group consisting of molybdenum, tantalum, tungsten, and combinations thereof.

15. The electrochemical cell of claim 12 wherein the anode is composed of a first active electrode material selected from the group consisting of lithium, lithium alloys, lithium silver, lithium aluminum, lithium boron, lithium silver boron, carbon, and combinations thereof.

16. The electrochemical cell of claim 12 wherein the cathode is composed of a second active electrode material selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide and mixtures thereof.

17. The electrochemical cell of claim 12 wherein the electrolyte comprises a nonagueous solvent and an ionically conductive salt dissolved therein.

18. the electrochemical cell of claim 12 wherein the direct resistance weld is characterized as having been formed by contacting the first metal of the current collector to a negative terminal of an electrical power Source and the second metal of the terminal pin to a positive terminal of the electrical power source.

19. An electrochemical cell, comprising:
a) a casing;
b) an electrode assembly contained within the casing, the electrode assembly comprising:
  i) an anode composed of an active anode material, a cathode composed of an active cathode material, a separator membrane residing between the anode and the cathode; and
  ii) at least one current collector composed of aluminum, the current collector comprising a connection tab extending from a current collector body, wherein the current collector body is contacted to one of the active anode or cathode active materials to thereby form the respective anode or cathode; and
c) an electrolyte contained within the casing to activate the electrode assembly; and
d) a terminal pin passing through a feedthrough in a nonconductive relationship with the casing, wherein the terminal pin is composed of molybdenum, and wherein the terminal pin extends from a proximal terminal pin portion connected inside the casing to the current collector for the one of the anode and the cathode to a distal terminal pin portion residing outside the casing as a first terminal for the anode or the cathode;
e) wherein the proximal terminal pin portion is joined to the connection tab of the current collector by a direct resistance weld, the weld comprising:
  i) a fusion zone of the first metal having a fusion zone thickness extending from an interface contacting the terminal pin to a distal fusion zone region, wherein the aluminum of the current collector is joined to the molybdenum of the terminal pin at the interface, an intermetallic alloy composed of the aluminum and the molybdenum is not formed at the interface, and wherein the fusion zone is comprised of first columnar shaped grains of the first metal radiating from the interface toward the current collector body and second metallic grains up to 0.1 micrometers in size; and
  ii) a heat affected zone of the first metal having a heat affected zone thickness extending from the distal fusion zone region to a distal heat affected region at the current collector body, wherein the heat affected zone is comprised of heat affected grains of the aluminum, the heat affected grains being at least two times the size of grains of the aluminum that are substantially unaffected by heat created during formation of the weld; and
f) wherein the casing is a second terminal for the other of the anode and the cathode not connected to the terminal pin.

20. The electrochemical cell of claim 19 wherein the anode is composed of a first active electrode material selected from the group consisting of lithium, lithium alloys, lithium silver, lithium aluminum, lithium boron, lithium silver boron, carbon, and combinations thereof.

21. The electrochemical cell of claim 19 wherein the cathode is composed of a second active electrode material selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide and mixtures thereof.

22. The electrochemical cell of claim 19 wherein the electrolyte comprises a nonaqueous solvent and an ionically conductive salt dissolved therein.

* * * * *

UNITED STATES PATENT AND TRADEMARK OFFICE
CERTIFICATE OF CORRECTION

PATENT NO. : 8,722,238 B2  
APPLICATION NO. : 12/944859  
DATED : May 13, 2014  
INVENTOR(S) : Xiangyang Dai It is certified that error appears in the above-identified patent and that said Letters Patent is hereby corrected as shown below:

In the Claims

Column 13, line 27 (Claim 2, line 3) after the word "125°C" delete the "."

Column 13, line 31 (Claim 3, line 3) after the word "500°C" delete the "."

Column 13, line 36 (Claim 5, line 1) after the word "cell" delete the ","

Column 15, line 14 (Claim 17, line 2) delete "nonagueous" and insert --nonaqueous--

Column 15, line 19 (Claim 18, line 4) delete "Source" and insert --source--

Column 16, line 12 (Claim 19, line 12) delete "δf" and insert --of--

Signed and Sealed this  
Twenty-third Day of September, 2014

Michelle K. Lee  
*Deputy Director of the United States Patent and Trademark Office*